Aug. 14, 1962 W. H. TUBBS 3,049,055
MULTIPLE PURPOSE SOLAR REFLECTOR
Filed Nov. 27, 1959
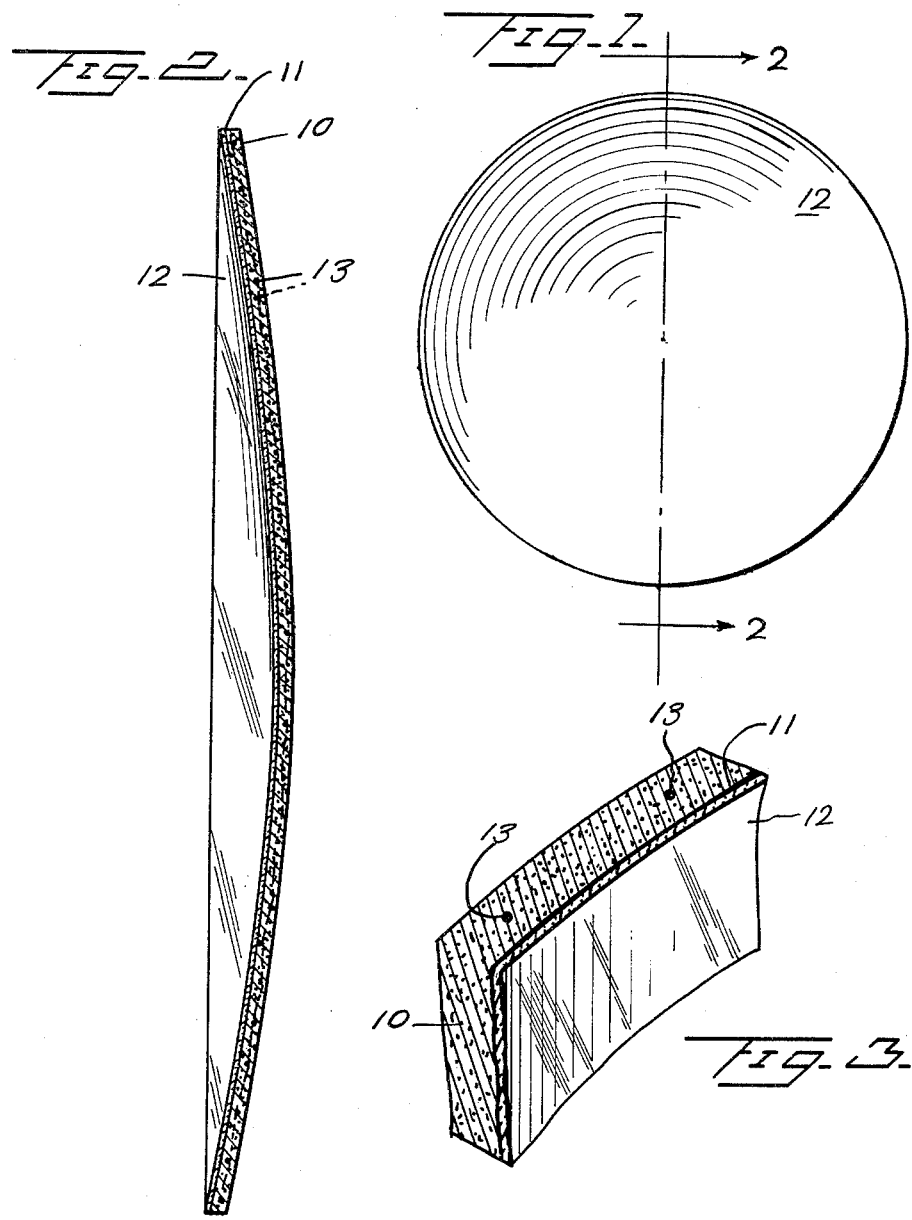
W.H. TUBBS
INVENTOR
BY CA Snow & Co.
ATTORNEYS.

United States Patent Office 3,049,055
Patented Aug. 14, 1962

1

3,049,055
MULTIPLE PURPOSE SOLAR REFLECTOR
William Henry Tubbs, 377 Nye St., Marion, Ohio
Filed Nov. 27, 1959, Ser. No. 855,650
1 Claim. (Cl. 88—105)

This invention relates to a multiple purpose solar reflector.

The object of the present invention is to provide a multiple purpose solar reflector of unusually large size for receiving the sun's rays in considerable quantity and reverting them to a focal point.

Another object of the present invention is to provide a multiple purpose solar reflector which is of sufficient size to receive an adequate quantity of the sun's rays and revert them to a focal point for heating a house, heating water used in a house, or cooking food.

A further object of the present invention is to provide a multiple purpose solar reflector which can be produced at a lower cost than the comparable devices in the prior art, even when produced as a single unit or in small quantities.

An additional object of the present invention is to provide a multiple purpose solar reflector of quite large size which in spite of its size, can be readily fabricated at the intended place of use.

Still other objects, advantages and improvements will become apparent from the following specification, taken in connection with the accompanying drawing, in which:

FIGURE 1 is a front elevational view, on a reduced scale, of the solar reflector according to the present invention.

FIG. 2 is a sectional view, taken on the section line 2—2 of FIG. 1 and looking in the direction of the arrows.

FIG. 3 is a fragmentary detail view, on an enlarged scale.

Referring now to the drawings in detail, and to FIG. 2 in particular, there is here shown the solar reflector according to the present invention, comprised by a backing or support 10, an intermediate layer of cementitious material 11, and the reflecting surface 12. The backing 10 is preferably comprised by prestressed reinforced concrete. The thickness of the backing should be two (2) inches or more and it is formed as a segment of a spherical surface having at least a sixty (60) foot radius, so as to have a focal length of at least thirty (30) feet or more.

The backing 10 is cast from a die on the site where the solar reflector is to be used. Reinforcing rods are shown in the concrete at 13. The pre-stressed condition of the concrete is attained by placing the reinforcing rods 13 under tension before the concrete is poured. On the inner face of the support there is provided suitable scoring (not shown), which is formed by complementary scored areas on the exposed face of the die.

The reflecting surface is comprised by a facing 12 of aluminum foil. It is secured to the inner face of the backing 10 by a layer of plaster 11, to which the facing adheres and which in turn adheres to the inner face of the support 10, assisted by the above referred to scoring (not shown).

It is within the contemplation of the invention to use for the facing 12 sheet aluminum of twenty (20) or larger gauge number, which would preferably be at least partially pre-formed on a hydraulic press.

Having now fully described my invention, which I claim as new and useful and desire to secure by Letters Patent of the United States is:

A solar reflector including a reflective facing of metallic foil, a thick backing of pre-stressed artificial stone formed as a concave segment of a sphere of artificial stone of at least fifty times the thickness of the facing of metallic foil and covered over its concave surface by the latter, reinforcing members in the backing at its mid-section and curved on the same radius of curvature as the latter at its mid-section, and an intermediate layer of cementitious material adhering the facing of metallic foil to the backing of artificial stone.

References Cited in the file of this patent

UNITED STATES PATENTS

| | | |
|---|---|---|
| 501,514 | Jacobson | July 18, 1893 |
| 514,148 | Jacobson | Feb. 6, 1894 |
| 1,384,420 | Akeley | July 12, 1921 |
| 1,394,085 | Halvorson | Oct. 18, 1921 |
| 2,723,919 | Pohnan | Nov. 15, 1955 |
| 2,755,630 | Freyssinet | July 24, 1956 |
| 2,963,273 | Lane | Dec. 6, 1960 |